United States Patent
Logan et al.

(10) Patent No.: US 6,578,066 B1
(45) Date of Patent: Jun. 10, 2003

(54) DISTRIBUTED LOAD-BALANCING INTERNET SERVERS

(75) Inventors: David B. Logan, San Jose, CA (US); Shirish Sathaye, San Jose, CA (US)

(73) Assignee: Alteon Websystems, San Jose, CA (US)

( * ) Notice: Subject to any disclaimer, the term of this patent is extended or adjusted under 35 U.S.C. 154(b) by 0 days.

(21) Appl. No.: 09/398,248

(22) Filed: Sep. 17, 1999

(51) Int. Cl.[7] .............................................. G06F 15/173

(52) U.S. Cl. ....................... 709/105; 709/223; 709/228; 709/203; 370/312

(58) Field of Search ................................. 709/201–203, 709/105, 102, 223, 228; 712/27; 370/312

(56) References Cited

U.S. PATENT DOCUMENTS 6,092,178 A * 7/2000 Jindal et al. .................. 712/27

OTHER PUBLICATIONS

Colajanni, M. Yu,P.S. Dias, D.M. "Anallysis of task assignment policies in scalable distributed Web–server systems" pp. 585–600, Jun. 1998.*

* cited by examiner

Primary Examiner—Moustafa M. Meky
Assistant Examiner—Hieu C. Le
(74) Attorney, Agent, or Firm—Steubing McGuinness & Manaras LLP

(57) ABSTRACT

The actual site that serves the Web pages to a client in response to a URL domain name is automatically and transparently selected from a list of many switches each having identical data storage. In a peer hand-off process, a switch receives domain name server lookup request for a particular virtual Internet protocol (VIP) domain name. The switch examines the source IP-address for the domain name server request, examines the user's IP-address, and determines if there is server site that is geographically close to that user. The switch examines an ordered hand-off table corresponding to the domain. The switch chooses a next remote server (or its own VIP) in line based on, (a) the remote server location compared to domain name server request source, (b) the remote servers' weights, and (c) the remote server that experienced the previous hand-off. The switch then sends the domain name server response back to client domain name server with the IP-addresses in an ordered list.

12 Claims, 3 Drawing Sheets

DISTRIBUTED LOAD-BALANCING INTERNET SERVERS

BACKGROUND OF THE PRESENT INVENTION

1. Technical Field

The present invention relates generally to computer data network equipment and methods, and more particularly to balancing the loading amongst distributed network servers by controlling the conversion of domain names to IP-addresses in domain name server equipment. The invention selects the load distribution criteria based on a unique algorithm.

2. Description of the Prior Art

The world wide web (WWW), and especially the Internet, are quickly becoming the principle way businesses sell products and communicate with customers and suppliers. Some now call the Internet a "mission-critical business delivery infrastructure." As a consequence, internet servers and so-called "Intranet" servers are worked harder than ever before. The number of clients servers now must support has increased dramatically. Intranet servers must now be able to service hundreds of simultaneous client requests, while their external-counterpart Internet servers must be able to support tens of thousands of simultaneous client connections.

Clients demand and expect rapid response and a 7-day and week, 24-hours a day ("7×24") availability. Mission-critical web-computing infrastructures must be able to dynamically scale server capacity to match aggregate client demand and still ensure continuous service availability. One way to do just that has been to run each application on several servers, and then continually balance the client loading on the various servers, e.g., "server load balancing."

Server load balancers use information in the Layer 3 and Layer 4 packet headers to identify and manage application-layer sessions. For example, TCP or UDP port numbers, the SYN/FIN bits that mark the start and end of TCP application sessions and IP source and destination addresses.

Traditional server load balancers are PC-based software products with limited performance and connectivity. The rapid growth in traffic volume and server population is giving rise to a new generation of switch-integrated server load balancers that offer many orders of magnitude improvements in performance, connectivity, resiliency and economy.

A new generation of switch-based server load balancers consolidates multiple web infrastructure functions and load balancing application servers with multi-layer switching, e.g., redirection traffic to caches, load balancing traffic to multiple firewalls, packet filtering and bandwidth management.

Alteon WebSystems coined the term "Server Switch" to represent this new class of device that front-ends server farms and provide server-related traffic management in all mission critical internet/Intranet infrastructures. Server Switches dynamically distribute application load across a group of servers running a common application (or set of applications) while making the group appear as one server to the network. A number of web servers with access to the same content can be logically combined into an HTTP hunt group, which is a group of servers that supports a common application or set of applications. The hunt group provides a "virtual" HTTP service to clients. Clients are not aware that there are a number of real servers participating in providing this service. The clients access the service using a virtual service address that resides in a server switch that front-ends the real servers. As connection requests arrive for the virtual service, the server switch passes these requests onto one of the real servers in the hunt group based upon knowledge of the servers' availability, load handling capability, and present load.

In this way, multiple servers can be used to achieve the total amount of application processing capacity demanded by the users of the system. Each new server adds its capacity to the pool of processing power available for the application.

Equally important, as servers go out of service due either to failure or maintenance operations, the remaining healthy servers pick up the load with little or no perceived impact to users. To achieve this, the server switch must continuously monitor the health of all servers and each application to which it distributes client load. The server switches must also support hot-standby configurations for complete systems redundancy.

A key part of server load balancing is session management. Once a session request is assigned to a real server, the server switch must recognize all successive packets associated with that session. These packets are processed and forwarded appropriately to make sure that the client continues to be associated with the same physical server for the duration of each session.

Server switches also monitor the completion of sessions at which time the binding of the connection to the physical server can be removed. This ensures that the next time a client connects, he is preferably connected to the most available server at the time, providing the best possible service to each client. Special mechanisms can be invoked by the administrator if the application requires successive connections to be forwarded to the same physical server, such as with FTP control and data connections, SSL (Secure Sockets Layer), and persistent HTTP used for multi-page forms and search engines.

Environments that benefit from server load balancing include web hosting services, on-line service providers and corporate data centers with high availability requirements. In theory, server load balancing can be used to support any TCP-based or UDP-based application where common content is available across a group of servers. In practice, servers supporting Internet/Intranet applications, such as web servers, FTP servers, domain name server servers and RADIUS servers is preferably the first to take advantage of server load balancing to support the high growth and unpredictable volume of web-oriented traffic.

The majority of web pages contain read-only information. This makes web-hosting environments ideal for server load balancing. Web hosts and on-line service providers typically deploy multiple HTTP, FTP and other application servers today, with load distributed across them statically, or more commonly, via round-robin domain name server. Both methods are undesirable because they are not fault-tolerant and require a high degree of administration. Server load balancing enables transparent use of multiple servers with built-in high availability support.

Many clustering systems today provide superior failover capabilities but offer no load-balancing support. Some systems also limit the number of servers that can participate in a cluster. These constraints impact the scalability of the clustering solutions. Server load balancing enables flexible coupling of servers into load-sharing hunt groups. It also improves server utilization efficiency by enabling redundant servers to share load.

More often than not, server environments today are multi-vendor and multi-OS. Popular clustering solutions today are limited to servers from a single vendor or servers running a single operating system. Server load balancing on a server switch enables heterogeneous servers supporting TCP and UDP applications to be loosely coupled in a load-sharing cluster, maximizing server investment returns.

SUMMARY OF THE PRESENT INVENTION

An actual Internet web-site that serves the web-pages to a client in response to a URL domain name is automatically and transparently selected from a list of many distributed sites each having identical data storage. In a peer hand-off process, a switch receives domain name server lookup request for a particular domain name. The switch examines the source IP-address for the domain name server request, examines the user's IP-address, and determines if there is server site that is geographically close to that user. The switch examines an ordered hand-off table corresponding to the domain. The switch chooses a next remote server (or one of its own virtual Internet protocol addresses) based on, (a) the remote server location compared to domain name server request source, (b) the remote servers' weights, and (c) the remote server that experienced the previous hand-off. The switch then sends the domain name server response back to client domain name server with the IP-addresses in an ordered list.

DETAILED DESCRIPTION OF THE PRESENT INVENTION

Figure 1:
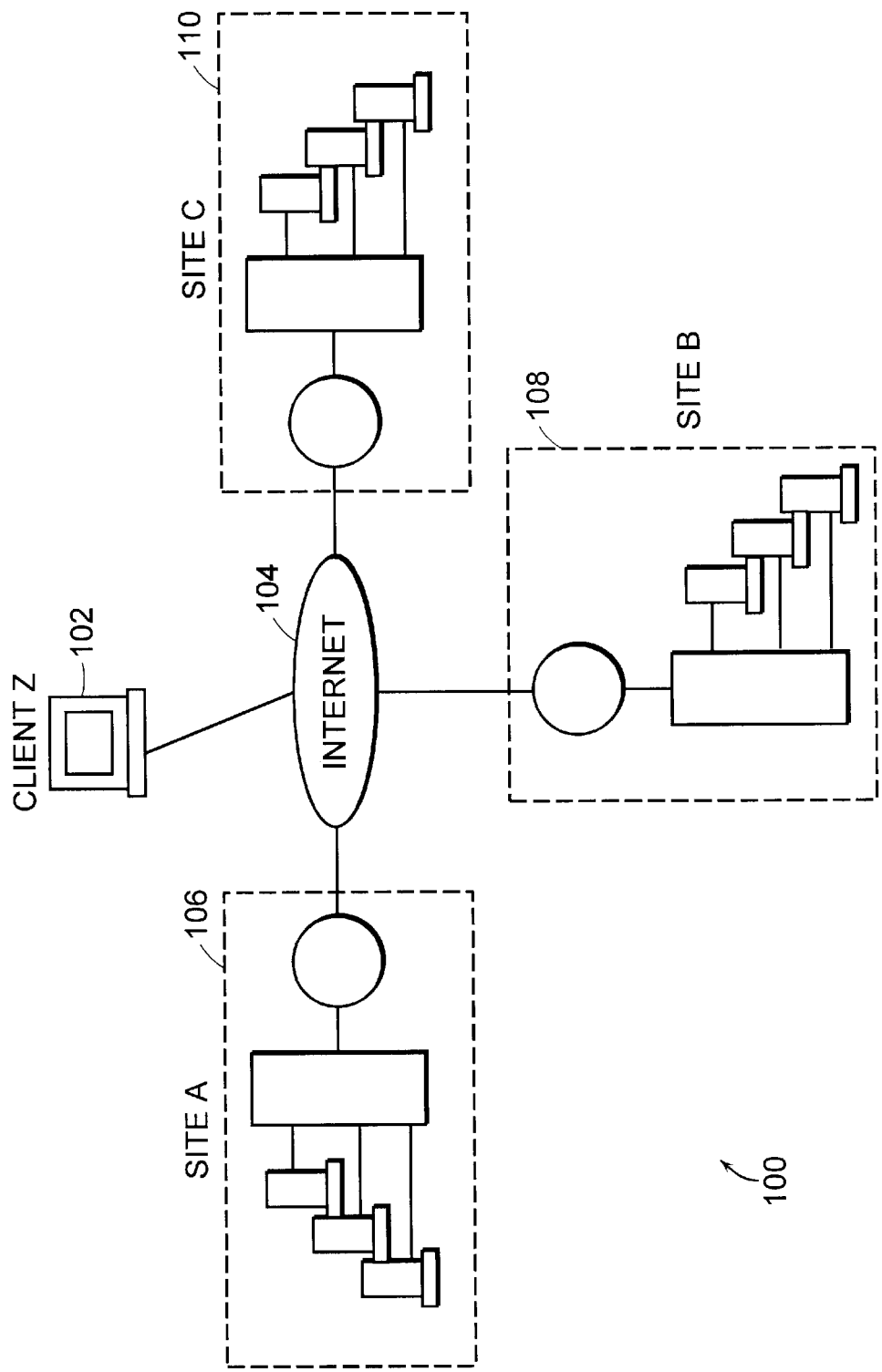
FIG. 1 is a block diagram of a distributed-server load-balancing system embodiment of the present invention.

FIG. 1 represents a distributed-server load-balancing system embodiment of the present invention, and is referred to herein by the general reference numeral 100. The distributed-server load-balancing system 100 allows web-based content and services to be redundantly delivered to many clients, represented by a client "Z" 102, from many independent web-server sites over Internet 104. When a client 102 loads a web-browser program and enters a uniform resource location (URL), e.g., "www.alteon.com/products/index.html".

While IP-addresses used on the Internet 104 are 32-bits in length, most users do not memorize the numeric addresses of the hosts to which they attach. Instead, people are more comfortable with host names. Most IP hosts, then, have both a numeric IP-address and a name. While this is convenient for people, however, the name must be translated back to a numeric address for routing purposes. Internet hosts use a hierarchical naming structure comprising a top-level domain (TLD), domain and subdomain (optional), and host name. The IP-address space, and all TCP/IP-related numbers, is assigned and maintained by the Internet Assigned Numbers Authority (IANA). Domain names are assigned by the TLD naming authority; until April 1998, the Internet Network Information Center (InterNIC) had overall authority of these names, with NICs around the world handling non-U.S. domains. The InterNIC was also responsible for the overall coordination and management of the domain name System (DNS), the distributed database that reconciles host names and IP-addresses on the Internet.

In client-Z 102, a domain name server "getByHostname" query is actually issued to a local domain name server, asking for the numeric Internet Protocol address (IP-address) that has been registered for use with "www.alteon.com". Each local domain name server checks to see if it already knows the IP-addresses for the hosts that service particular domain name and host. It could know this by having previously needing this information and storing the answer it discovered in a local private cache memory. If the local domain name server does not know the hostname IP-address for a requested URL domain name, it will perform an iterative query to a domain name server higher in the DNS hierarchy. Such domain name server query will either be answered by a higher level domain name server, or the request will ultimately bubble up to one of a distributed-server network switch sites 106, 108, or 110.

IP-addresses are hierarchical for routing purposes and are subdivided into two subfields. The Network Identifier (NET_ID) subfield identifies the TCP/IP subnetwork connected to the Internet. The NET_ID is used for high-level routing between networks, much the same way as the country code, city code, or area code is used in the telephone network. The Host Identifier (HOST_ID) subfield indicates the specific host within a subnetwork.

Most IP hosts usually have both a numeric IP-address and a name. The name is provided as a convenience for people, however such name must be translated back to a numeric address for routing purposes. Internet hosts use a hierarchical naming structure comprising a top-level domain (TLD), domain and subdomain (optional), and host name. The distributed-server network switches 106, 108, and 110 are organized as distributed sites, where each acts as an Authoritative Name Server for a sub-domain, e.g., "www.alteon.com". Each such distributed site is capable of responding to a domain name server query with the IP-address identities that correspond to "www.alteon.com".

The TCP/IP protocol suite comprises two protocols that correspond roughly to the OSI Transport and Session Layers. These protocols are called the Transmission Control Protocol and the User Datagram Protocol (UDP). Individual applications are referred to by a port identifier in TCP/UDP messages. The port identifier and IP-address together form a socket. Well-known port numbers on the server side of a connection include port-20 (FTP data transfer), port-21 (FTP control), port-23 (Telnet), port-25 (SMTP), port-43 (whois), port-70 (Gopher), port-79 (finger), and port-80 (HTTP).

For illustration purposes, assume that the distributed-server switch 108 receives a domain name server query that originated with client 102. In embodiments of the present invention, the distributed-server switch 108 will return a set of IP-addresses that represent a virtual-IP (VIP). For example, the distributed-server switch 108 could respond to the URL query with a set of IP-addresses including "192.168.13.20", "162.113.25.28", and "172.176.110.10", any one of which could satisfy web-based content and service demands associated with the single URL. Each of these several IP-addresses exists at a geographically diverse server, e.g., as represented by distributed server switches 106 and 110. The client 102 will receive such response via its local domain name server. The client 102 is then able to use these IP-addresses and open a TCP Port 80 connection to "192.168.13.20" which is, for example, a VIP-address actually running at distributed-server switch 106. The client 102 does not know this is only a VIP, and can ignore a real IP-address of "192.168.13.10" that exists at switch 106. Thereafter, the traffic generated by client 102 with the "www.alteon.com" website is handled by the distributed-server switch 106 and off-loaded from the other possible switches 108 and 110.

The VIP's set up for each switch 106, 108, and 110 must each enable client access to the same content and applications, so that a request to any one will result in the same data being given to the client 102. A policy therefore needs to be established that distributes the available resources to the users needing service. The factors to consider in such policy include the health of the individual distributed-server VIP's involved, the basic Internet assigned numbers authority (IANA) registered location of the client and server(s), and a list of the available servers according to currently measured response times and throughputs. Those servers that are the healthiest, more closely located, and showing good response times and throughputs should have more of the traffic directed to them. This is done by responding with their corresponding VIP's more often.

The DNS is a conventional distributed database of host name and IP-address information for every domain on the Internet. There is a single authoritative name server for every domain. About a dozen root servers have a list of all of these authoritative name servers. When a request is made by a host to the DNS, the request goes to a local name server. If there is insufficient information at the local name server, a request is made to the root to find the authoritative name server, and the information request is forwarded to that name server. Name servers contain the following types of information:

| | |
|---|---|
| A-record: | An address record maps a hostname to an IP-address. |
| PTR-record: | A pointer record maps an IP-address to a hostname. |
| NS-record: | A name server record lists the authoritative name server(s) for a given domain. |
| MX-record: | A mail exchange record lists the mail servers for a given domain. |

If the server switch 106, 108, or 110, that client 102 has been pointed to suddenly experiences a failure or is overloaded, it will issue an ""HTTP redirect"". The client 102 is thus commanded to go to a different server switch 106, 108, or 110. The ""HTTP redirect"" will occur when an "HTTP Request" arrives at a VIP that is at maximum connections ("MaxConns") or no longer has any healthy real servers.

The distributed-server load-balancing system 100 of FIG. 1 uses a domain name server to respond to DNS-requests for VIP sites. The "www.alteon.com" example represents several VIP's scattered through the United States with access to the same content for the Alteon Web distributed-server. When the switch receives a domain name server Name Request to resolve "www.alteon.com", associated with a VIP, it will respond with an appropriate domain name server response that matches the "best site" to respond to the subsequent content requests. Such best site, for example, represents the one that imposes minimum delays on the greatesat numbers of users. Other criteria are possible, such as defining the best site to respond as the one that is the least costly.

Site health and throughput measurement is obtained during "L4 health-checking" (with content verification as an option) with all the other peer remote sites 106, 108, and 110. Such is used to determine the status of the application availability and also the throughput performance of each site.

A distributed SLB state protocol is used that is capable of exchanging health, load and throughput information between sites either periodically, or when triggered by a predefined event. An Internet topology awareness is preferably included in embodiments of the present invention.

For Internet topology awareness, the particular switch used for DNS/HTTP hand-offs will examine the Source_IP for the request, and will respond with a "best" server based on the IANA allocated IP-address space throughout the world. Other hand-off criteria is also included. An external "subscribers database" may be required to provide the necessary amount of detail that describes where registered user networks are located. This information can be found at the Internet Assigned Numbers Authority and the WHOIS database.

Figure 2:
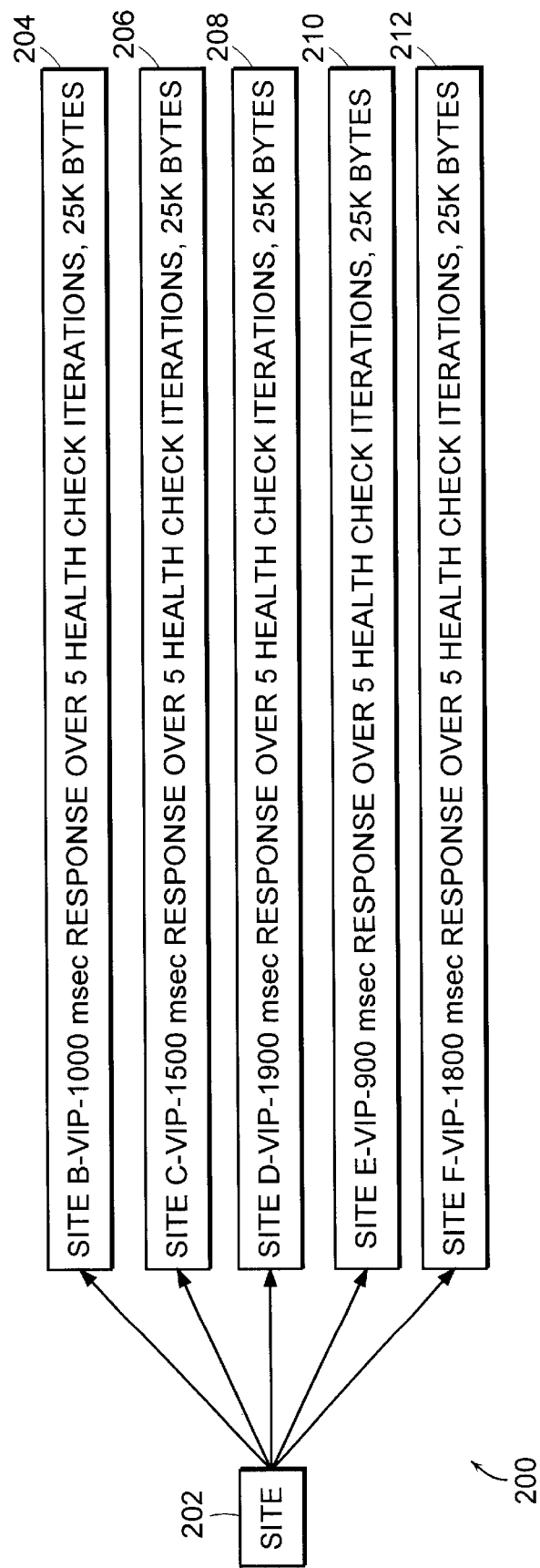
FIG. 2 is a diagram illustrating the information a site-A can obtain about several other sites that could redundantly support client requests for web-page accesses.

FIG. 2 is used to help illustrate distributed site monitoring environment 200. A typical main content server site 202 has access to a set of defined REAL SERVER's which correspond to VIP's running in distributed site switches, e.g., defined remote servers 204, 206, 208, 210, and 212. Each main site 202 does a periodic health and throughput check of each defined remote server. And each switch tests each of its defined remote REAL SERVER's which correspond to VIP's running in distributed-site switches. By executing a configurable iterative health-check to each remote server 204, 206, 208, 210, and 212, a main site 202 can learn the average response times and content availability in preparation for a hand-off. These content health-checks are preferably measured from start-time, to end-time, for all iterations of the health-check. Site and switch can be used interchangeably. One switch per site is assumed in this example.

In FIG. 2, the distributed-server switch 202 could determine that its preferred hand-off sites are defined remote servers 210, 204, 206, 208, in order of priority. The 900 msec response of defined remote server 210 is more attractive than the slower responses of the others. The response times of each remote server 210, 204, 206, 208 are recorded at main site 202 as a time-weighted average. This information is also communicated by each switch to all other switches using distributed-site status protocol. Each other switch does response time and throughput tests for each of its defined remote real servers, and computes total start-of-test to end-of-test response interval.

For applications and protocols that have content health-checking support, e.g., HTTP, FTP, NNTP, DNS, SMTP, and POP3, the content can be iteratively accessed based on the content configuration, e.g., URL, filename, etc., as defined by the Admin. For applications and protocols not supported with content health-checking, or in cases where the content configuration has not yet been defined, a TCP OPEN/CLOSE connection processes can be executed to produce nearly the same information for the server load balancing.

In FIG. 2, there are a set of four distributed sites to distributed-server switch 106. A health/throughput check is done for each defined remote server corresponding to a distributed site VIP. If there are five VIP's defined at distributed-server switch 106 which have corresponding Remote REAL SERVER's at each site, the switch at distributed-server switch 106 will have to do 20 Health/Throughput checks over the health-check interval (four distributed sites, with five Remote VIP's apiece).

Real server health was monitored in test equipment through a series of TCP-SYN requests to the services that are configured on the real servers. These requests took place every few seconds by default. Any unresponsive servers would receive iterative requests until the server was declared "down" or became responsive.

Another consideration is what an individual switch should do if it cannot reach a remote server during health-checks.

When this situation occurs, the switch that no longer can communicate to another switch should (a) no longer consider the server switch eligible for connection hand-offs, and stop using the remote server's VIP as a target for domain name server responses or "HTTP redirects"; and (b) send out a distributed site state protocol (DSSP) triggered update to inform all other distributed sites that the server switch is not responsive. All other sites may then determine if the server switch is responsive and act accordingly.

The Distributed distributed-server State Protocol (DSSP) is used to communicate Status and Health information from one site, to every other Distributed distributed-server. The Protocol is capable of determining (a) is this a normal and periodic UPDATE or is this an EVENT notification?, (b) a VIP hand-off ordered list and weighted average response times, (c) any remaining distributed-server capacity such as connections available per VIP and remaining memory resources available in the switch.

It is not necessary to use DSSP as a "keep-alive" or "hello-are-you-there?" protocol, because the normal periodic Real server health-checking protocol will determine whether a site is responsive or not.

Table I represents the simulated response times in a hypothetical network with sites A–F with a single VIP per site, similar to that of FIG. 2. The times are with respect to each site's point of view. In embodiments of the present invention, tables of information, like that represented by Table I, are communicated between sites using DSSP. Each recipient site does comparisons of throughput numbers to create a VIP hand-off ordered list for use later. Each switch at each site A–F calculates the same hand-off table, with the exception that if a tested distributed-server did not respond to any health-checks, it is considered as being "down" from the testing site's perspective.

TABLE I

| | site doing the test | | | | | |
|---|---|---|---|---|---|---|
| site tested | A | B | C | D | E | F |
| A | * | 3155 | 1073 | 3439 | 113 | 641 |
| B | 2925 | * | 1314 | 378 | 813 | 1827 |
| C | 1364 | 207 | * | 3869 | 995 | 3883 |
| D | 197 | 2490 | 1997 | * | 1190 | 339 |
| E | 3702 | 1106 | 1743 | 2344 | * | 468 |
| F | 1759 | 1409 | 683 | 2235 | 419 | * |

(average delay time in milliseconds)

It would appear to site-A with these measurements that site-D is high throughput. Site-B sees site-C as having high throughput, and site-C and site-E will determine site-F has high throughput.

Table II is the result of what each site's ordered hand-off preferences would be, given the measurements in Table I. When this information is exchanged between sites, each switch calculates how many times each site was first preference, second preference, etc.

TABLE II

| | site preference choices | | | | | |
|---|---|---|---|---|---|---|
| order | A | B | C | D | E | F |
| 1 | D | C | F | B | A | D |
| 2 | C | E | A | F | F | E |
| 3 | F | F | B | E | B | A |

TABLE II-continued

| | site preference choices | | | | | |
|---|---|---|---|---|---|---|
| order | A | B | C | D | E | F |
| 4 | B | D | E | A | C | B |
| 5 | E | A | D | C | D | C |

In Table II, site-A was first preference in one instance. Site-B was first preference in one instance. Site-C was first preference in one instance. Site-D was first preference in two instances. Site-E was first preference in one instance. Site-E never appeared. And, site-F was first preference in one instance. The second row produces A=1, B=0, C=1, D=0, E=2, F=2.

TABLE III

Static Weight Table
DNS/HTTP Redir Hand-off Weights (with Traff Dist)

| site | total weight | traffic disti | order | given weight |
|---|---|---|---|---|
| A | 7 | 17% | weight-1 | 4 |
| B | 6 | 14% | weight-2 | 2 |
| C | 6 | 14% | weight-3 | 1 |
| D | 8 | 19% | weight-4 | 0 |
| E | 5 | 12% | weight-5 | 0 |
| F | 10 | 24% | weight-6 | 0 |

Looking at the given weight column in Table III, each first place appearance preferably receives four times as much weight as a third place appearance. Each second place appearance receives 2 times as much weight as a third place appearance. Fourth through Sixth place appearances receive no weight. Thus an algorithm embodiment of the present invention can be constructed, as shown in Table IV.

TABLE IV

Site-A's "total weight" = (1*4) + (1*2) + (1*1) = 7;
Site-B's "total weight" = (1*4) + (0*2) + (2*1) = 6;
Site-C's "total weight" = (1*4) + (1*2) + (0*1) = 6;
Site-D's "total weight" = (2*4) + (0*2) + (2*1) = 10;
Site-E's "total weight" = (0*4) + (2*2) + (1*1) = 5; and
Site-F's "total weight" = (1*4) + (2*2) + (2*1) = 10.

There are several advantages in using such a method. The sites that do the best will generally receive more connections than other sites, but not too many of the connections. Any hand-offs that occur is preferably averaged across the top few sites, and such is made tunable by adjusting the static hand-off weighting. The sites that are seen as poorly performing by all other sites will tend to receive fewer or no hand-offs. If every site is performing well, including WAN links, servers, etc., then its likely that each site will receive an equal distribution of traffic over time.

A calculated hand-off table, such as Table III, is principally used for DNS response ordering and "HTTP redirect" preference. It is not used when a TCP connection request comes to a VIP unless an "HTTP redirect" is called for.

When three or fewer sites are involved in a monitoring and hand-off exchange process, the poor granularity in the hand-off determination may be a problem. In such a case, there will not be enough throughput-data samples to accurately determine "best" versus "worst" sites, except in the most extreme of cases. Controls and tunable parameters within the switches should be included to mitigate this issue in such environments. A promising algorithm to use is a set of comparisons of the VIPCONNS to MAXCONNS ratios. A site that can accept the most connections will have a tendency to receive the most connections.

DSSP triggered updates preferably contain all of the information that a regular update has, but such are sent immediately from one switch to all other switches when the switch is (a) no longer able to communicate with a remote server, or (b) when the switch experiences a local resource constraint, such as all servers are at their respective MaxConns, no real servers are available for a VIP, etc.

To illustrate a DSSP-update example, a site-A has five peers sites B–F. Each site A–F runs two VIP's and are peered with every other site. For session hand-off distributed-server determinations, each site's switch computes an ordered hand-off table for each matching domain name for each remote VIP/Local VIP combination. Each switch communicates a VIP that represents "www.Alteon.com", and an entry will appear in a calculated hand-off table based on the test responsiveness of each VIP. For a given domain name, such as "www.alteon.com", an ordered hand-off table is preferably constructed by each switch. The hand-off table is thereafter consulted when the switch receives a domain name server request for the domain name the table is constructed for. Each switch will dynamically update the remote real server's weight based upon computed weight values, as illustrated in the Tables herein. When the domain name server request for "www.alteon.com" is received by any switch, it will respond with the IP-address that corresponds to the "next eligible" remote server, based on the current weights. The VIP corresponding to distributed-server F will generally receive 25% of the requests. In other words, 25% of the time any switch receives a domain name server request, the switch will respond with distributed-server's VIP-address.

TABLE V

Ordered Hand-off Weight Table
DNS/HTTP Redir Hand-off Weights (with Traff Dist)

| site | total weight | traffic disti | order |
|---|---|---|---|
| A | 11 | 26% | weight-1 |
| B | 12 | 29% | weight-2 |
| C | 0 | 0% | weight-3 |
| D | 6 | 14% | weight-4 |
| E | 10 | 24% | weight-5 |
| F | 3 | 7% | weight-6 |

In the ordered hand-off table, Table V, site-C has a weight of zero. This VIP should never have any hand-off requests sent to it. In this example, sites A, B, and E will receive the majority of the hand-offs.

For session hand-off execution, when a switch receives a domain name server request for a domain name that it is hosting, it will respond with the appropriate IP-addresses of the switches that are load balancing those domains, based on hand-off weights, availability, etc. It is important to take into account the physical proximity when doing a hand-off. Generally, it is preferably best if users within a region are associated with servers in or near that region, unless the nearby server is down or overloaded. For example, let's say there are five sites that host content for "www.akeon.com" installed all over the world: San Jose (West-US); Atlanta (East-US), Ecuador (South America), Paris (France), and Tokyo (Japan). Users in Europe are preferably served by the Pads site, users in Chile are preferably served by the Ecuador site, etc. Having a user in Japan come all the way to the Atlanta site for content would waste bandwidth that many other users could have benefited from, and such service would directly result unnecessary response delays to the Japanese user.

It is therefore important for a switch to weigh-in to the final decision the geographic source of a user request prior to performing any session hand-off. When a switch receives a domain name server request for a domain that it is configured for, the switch should inspect the source IP-address of the request, and generally associate it with the IP-address blocks issued from IANA to the various regional registries. Table VI shows some of the address block allocations for the various regional registries, and their respective geographic domains.

TABLE VI

| | |
|---|---|
| RIPE NCC - Europe April 1997 | 063/8 |
| ARIN April 1997 | 064-095/8 |
| RIPE NCC - Europe May 1993 | 194/8 |
| RIPE NCC - Europe May 1993 | 195/8 |
| RIPE NCC - Europe May 1993 | 196/8 |
| ARIN - North America May 1993 | 199/8 |
| ARIN - North America May 1993 | 200/8 |
| ARIN - Central and South America May 1993 | 201/8 |
| ARIN - Central and South America May 1993 | 202/8 |
| APNIC - Pacific Rim May 1993 | 203/8 |
| APNIC - Pacific Rim May 1993 | 204/8 |
| ARIN - North America March 1994 | 205/8 |
| ARIN - North America March 1994 | 206/8 |
| ARIN - North America April 1995 | 207/8 |
| ARIN - North America November 1995 | 208/8 |
| ARIN - North America April 1996 | 209/8 |
| ARIN - North America June 1996 | 210/8 |
| APNIC - Pacific Rim June 1996 | 211/8 |
| APNIC - Pacific Rim June 1996 | 212/8 |
| RIPE NCC - Europe October 1997 | 213/8 |
| ARIN - North America April 1998 | 217/8 |

An extension of Table VI is preferably provided in a database form that can be accessed by each switch embodiment of the present invention. The source network is preferably resolved to a 124-bit IP subnet depth. The database used is preferably derived from the IANA "WHOIS" database. Using such a table of information in the switch will allow the domain name server responder to make a rough geographic decision on the source of the domain name server request. If the domain name server request is 211.123.11.20, the requesting host is located somewhere in the Pacific Rim area, and should be pointed to a site that begins with either 203, 204,211, 212. The switch preferably uses this table of information during all domain name server responses if any of the distributed sites VIP's are on geographically diverse networks.

In a peer hand-off process, a switch receives domain name server lookup request for a particular VIP domain name. The switch examines the source IP address for the domain name server request, examines the user's IP-address, and determines if there is server site that is geographically close to that user. The switch examines an ordered hand-off table corresponding to the domain. The switch chooses a next remote server (or its own VIP) in line based on, (a) the remote server location compared to domain name server request source, (b) the-remote servers weights, and (c) remote server that experienced the previous hand-off. The switch then sends the domain name server response back to client domain name server with the IP-addresses in an ordered list.

When the switch receives a "TCP SYN" to switch VIP, a either accepts packet or rejects the packet if the local VIP is overloaded. If rejected, the switch examines ordered hand-off table for this domain, and chooses a next remote server or its own VIP in line based on, (a) the remote servers location compared to domain name server request source, (b) the weights of each remote server, and (c) the remote server identified in a previous hand-off. The switch sends an ""HTTP redirect"" back to the client or drops the request, depending on load and availability of other sites.

When a switch issues a domain name server response, it will do so with a configurable domain name server TTL value, to ensure that downstream domain name server's do not cache the server switch's IP-address for too long a period of time.

For distributed load balancing parameters, each switch is preferably configured with switch-wide distributed SLB-parameters to recognize its distributed sites. For example, by a list of all the other switches' management IP-addresses.

Various tunable parameters are preferably included in embodiments of the present invention. Distributed sites with eight configurable distributed sites per switch, are configured with the remote switches' IP-addresses. Each of these sites can be recognized by a switch as a potential hand-off site where remote real servers (VIP's) exist. The distributed-server state protocol interval represents how often switches communicate regular DSSP updates. A range of 1–120 minutes is preferred with a default of one minute and may be turned off for individual sites. A domain name server TTL represents the TTL-value that is to be used when responding to domain name server requests. A range of 0–255 minutes is preferred with a default of one minute. For distributed SLB on/off controls, the ""HTTP redirect"" option can be used and set to "On/Off" with the default being "On," and also the "UseDNSRespond" option, which can be set to "On/Off," with the default being "On." Ordered Hand-off Weights (indexed 1–16), which can have a value of 1–64, to be taken into account while computing the ordered hand-off list.

Each hand-off weight index (1,2,3 . . . 16) corresponds to a best-performing to a worst performing-site. Each index can have a statically configured weight that is preferably multiplied by the server switch's relative positions in the ordered hand-off list. If the ordered hand-off weight (OHW) index-1 is set to four, the best performing site will receive four-times the connections of a site with a weight of one. A typical configuration may be to set: OHW-1 to "6", OHW-2 to "4", OHW-3 to "2", and all others to "1". This will lead to the first, second and third best performing sites to receive six times, four times, and two times as many hand-offs compared to the rest of the server switches.

Figure 3:
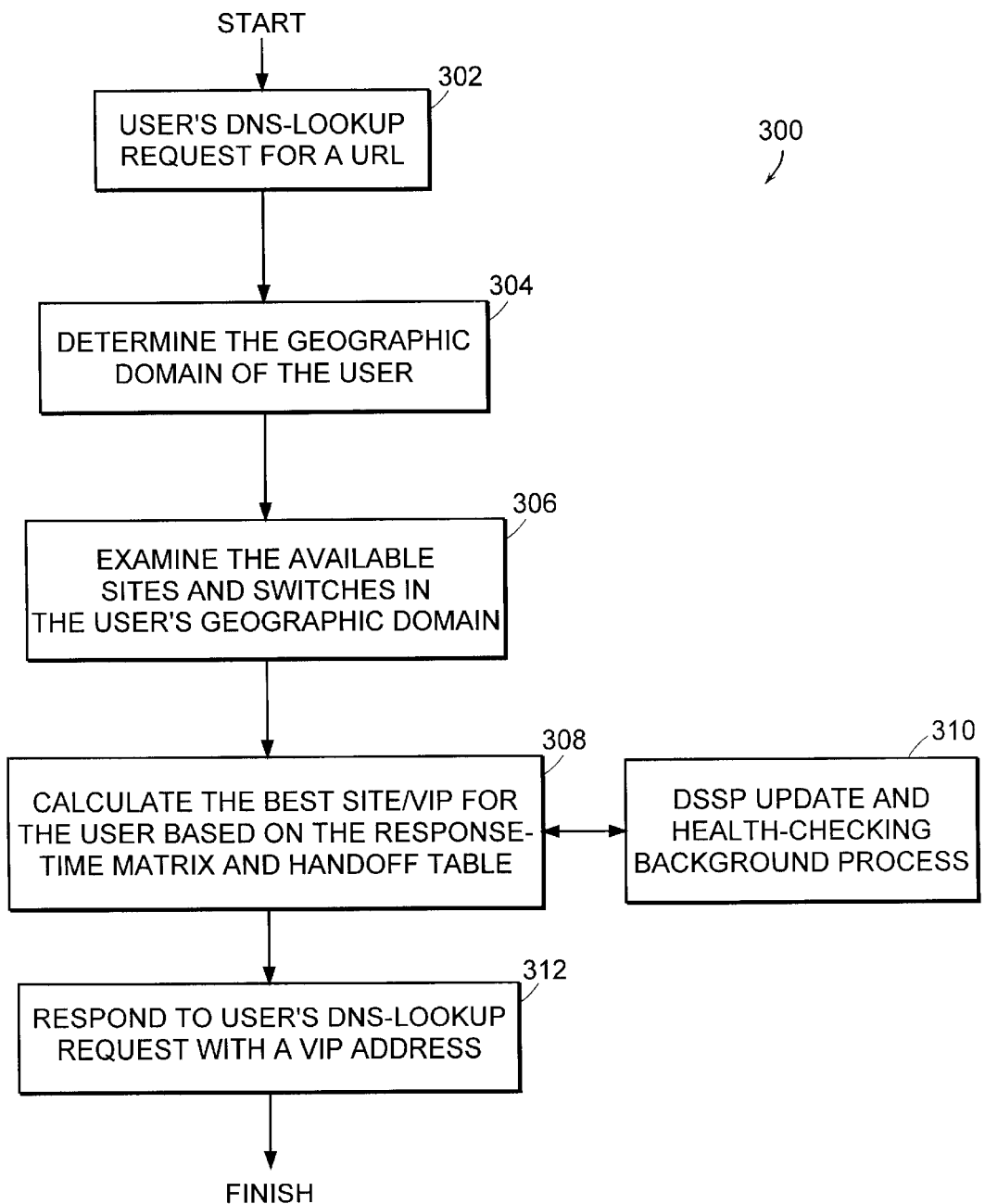
FIG. 3 is a flowchart of a distributed-server load-balancing method embodiment of the present invention.

FIG. 3 represents a flowchart of a distributed-server web-balance method embodiment of the present invention, and is referred to herein by the general reference numeral 300. The method 300 begins with a step 302 in which a user request for a DNS-lookup has been received. Such request asks' for a numeric IP-address that will respond with a particular web-based content and service. A step 304 determines what the geographic domain of the user is by inspecting the user IP-address included in the DNS-lookup query. A step 306 examines the available network sites and switches in or near the user's geographical area. A step 308 calculates the "best" virtual IP-server (VIP) that should be given the job of corresponding afterward with the user. What constitutes "best" depends on what goals are being addressed. "Best" could be best overall system performance from the perspective of the user, the web-site, the backbone operator, the Internet Service Provider (ISP), cost, etc. A background process 310 continually monitors the health and performance of all the VIP's. A step 312 responds to the user's DNS-lookup request with the IP-address of the "best" VIP to service the user.

Although the present invention is described herein with reference to the preferred embodiment, one skilled in the art will readily appreciate that other applications may be substituted for those set forth herein without departing from the spirit and scope of the present invention. Accordingly, the present invention should only be limited by the Claims included below.

What is claimed is:

1. A distributed load-balancing Internet server system for providing web-based content and services to be redundantly delivered to many clients, comprising:

a domain name system (DNS) server for receiving a DNS-lookup request from a network user for a conversion of a particular uniform resource locator (URL) for a domain host name to a numeric Internet Protocol (IP) address, wherein said network user exists in a particular geographical area that can be discerned from a user Ip address;

a plurality of web-server sites that are geographically diverse and accessible to said network user, wherein each duplicates another in its web-based content and services that relate to said particular URL;

a policy manager that monitors the health and response performance of each of the plurality of web-server sites, and that maintains a list of such ones of the plurality of web-server sites according to their individual accessibility and geographic location; and a DNS-query to IP-address converter connected to receive said DNS-lookup request from said network user, and connected to consult the policy manager for a preferred one of the plurality of web-server sites to respond to such DNS-lookup request, and further connected to provide said network user with an IP-address of said preferred one of the plurality of web-server sites;

wherein the policy manager further includes a response-time matrix and handoff table that maintains said list;

wherein: the policy manager further includes a hand-off weight index that corresponds to a best-performing to a worst performing web-server site and a statistically configured weight that is multiplied by a relative positions in the ordered hand-off list of a server switch.

2. The system of claim 1, wherein:

each of the plurality of web-server sites corresponds to a virtual IP-address (VIP) and is physically located at a different place in the world.

3. The system of claim 1, wherein:

each of the plurality of web-server sites is able to off-load the others and operate in parallel to serve many simultaneous network users with diverse geographic locations.

4. The system of claim 1, wherein:

the DNS-query to IP-address converter operates such that lookup requests are balanced amongst each of the plurality of web-server sites.

5. The system of claim 1, wherein:

the policy manager further includes an Internet topology awareness and a distributed Server Load Balancing (SLB)-state protocol that is capable of exchanging health, load and throughput information between web-server sites either periodically, or when triggered by a predefined event.

6. The system of claim 1, wherein:

the plurality of web-server sites includes a main-content site that provides all web-content and services for duplication by each other web-server site.

7. A method of providing web-based content and services from to many clients from load-balanced redundant sites in response to a single DNS-lookup request, the method comprising the steps of:

receiving at a domain name system (DNS) server a DNS-lookup request from a network user for a conversion of a particular uniform resource locator (URL) for a domain host name to a numeric Internet Protocol (IP) address, wherein said network user exists in a particular geographical area that can be discerned from a user Ip-address;

placing a plurality of web-server sites at geographically diverse locations that are accessible to said network user, wherein each web-server site duplicates another in its web-based content and services that relate to said particular URL;

monitoring with a policy manager the health and response performance of each of the plurality of web-server sites, and maintaining a list of such ones of the plurality of web-server sites according to their individual accessibility and geographic location; and converting a DNS-query to IP-address in response to a receipt of said DNS lookup request from said network user, and connecting to consult said policy manager for a preferred one of the plurality of web-server sites to respond to such DNS;

wherein: the step of monitoring is such that said policy manager further includes a response time matrix and handoff table that maintains said list;

wherein: the step of monitoring is such that said policy manager further includes a hand-off weight index that corresponds to a best-performing to a worst performing web-server site and a statistically configured weight that is multiplied by a relative positions in the ordered hand-off list of a server switch.

8. The method of claim 7, wherein:

the step of placing a plurality of web-server sites is such that each of said plurality of web-server sites corresponds to a virtual IP-address (VIP) and is physically located at a different place in the world.

9. The method of claim 7, wherein:

the step of placing a plurality of web-server sites is such that each of the plurality of web-server sites is able to off-load the others and operate in parallel to serve many simultaneous network users with diverse geographic locations.

10. The method of claim 7, wherein:

the step of converting is such that a DNS-query to IP-address converter operates such that lookup requests are balanced amongst each of said plurality of web-server sites.

11. The method of claim 9, wherein:

the step of monitoring is such that said policy manager further includes and Internet topology awareness and a distributed Server Load Balancing (SLB)-state protocol that is capable of exchanging health, load and throughput information between web-server sites either periodically, or when triggered by a predefined event.

12. The method of claim 7, wherein:

the step of placing is such that said plurality of web-server sites includes a main-content site that provides all web-content and services for duplication by each other web-server site.

* * * * *